(12) United States Patent
Kittelty et al.

(10) Patent No.: US 10,563,284 B2
(45) Date of Patent: Feb. 18, 2020

(54) LEACHING COPPER-CONTAINING ORES

(71) Applicant: Technological Resources Pty. Limited, Melbourne, Victoria (AU)

(72) Inventors: Daniel Arthur Kittelty, Pascoe Vale (AU); Paul Leslie Brown, Kiama (AU); Ralph Peter Hackl, Mount Eliza (AU); Pauline Maree Najjar, Coburg (AU); Anna Zonneveld, Hurstbridge (AU); Jason Maurice Young, Hastings (AU)

(73) Assignee: Technological Resources Pty. Limited, Melbourne, Victoria (AU)

( * ) Notice: Subject to any disclaimer, the term of this patent is extended or adjusted under 35 U.S.C. 154(b) by 0 days.

(21) Appl. No.: 16/364,453

(22) Filed: Mar. 26, 2019

(65) Prior Publication Data

US 2019/0345581 A1   Nov. 14, 2019

Related U.S. Application Data

(63) Continuation of application No. 16/153,043, filed on Oct. 5, 2018.

(30) Foreign Application Priority Data

May 9, 2018   (AU) .................................. 2018901583
Jul. 18, 2018  (AU) .................................. 2018902601

(51) Int. Cl.
 *C22B 3/20*   (2006.01)
 *C22B 15/00*  (2006.01)

(52) U.S. Cl.
 CPC .......... *C22B 3/205* (2013.01); *C22B 15/0008* (2013.01); *C22B 15/0065* (2013.01); *C22B 15/0071* (2013.01)

(58) Field of Classification Search
 CPC .. C22B 3/025; C22B 15/0008; C22B 15/0065
 See application file for complete search history.

(56) References Cited

U.S. PATENT DOCUMENTS 3,260,593 A * 7/1966  Malouf ............... C22B 15/0063
                                              423/DIG. 17
3,475,163 A * 10/1969 Mod ..................... C22B 3/1625
                                                       299/5

(Continued)

FOREIGN PATENT DOCUMENTS

AU        78560/98 A    2/1999
AU        749366 B2     6/2002

(Continued)

OTHER PUBLICATIONS

Chen, Yu-Wei; Yuerong Li, Mei-Fang Cai, Nelson Belzile, & Zhi Dang. "Preventing oxidation of iron sulfide minerals by polyethylene polyamines." Minerals Engineering 19 pp. 19-27. (Year: 2006).*

(Continued)

*Primary Examiner* — Tima M. McGuthry-Banks
(74) *Attorney, Agent, or Firm* — Banner & Witcoff, Ltd.

(57) ABSTRACT

A method of leaching copper-containing ores includes leaching copper-containing ores or concentrates or tailings of the ores or concentrates with a leach liquor in the presence of an additive that enhances the dissolution of copper from copper minerals in the ores and concentrates by forming a complex between (a) sulfur, that has originated from copper minerals in the ores, and (b) the additive. A method of leaching copper-containing ores includes leaching copper-containing ores or concentrates or tailings of the ores or concentrates with a leach liquor includes leaching copper-containing ores or concentrates or tailings of the ores or concentrates with a leach liquor in the presence of a nitrogen-containing organic complexing additive that forms a complex between sulfur, that has originated from copper minerals in the ores, and the additive.

28 Claims, 6 Drawing Sheets

(56) References Cited

U.S. PATENT DOCUMENTS

| | | | |
|---|---|---|---|
| 3,856,913 | A | 12/1974 | McElroy et al. |
| 4,571,387 | A | 2/1986 | Bruynesteyn et al. |
| 5,074,993 | A | 12/1991 | Kerr et al. |
| 5,411,148 | A | 5/1995 | Kelebek et al. |
| 5,462,720 | A | 10/1995 | Aragones |
| 6,277,341 | B1 | 8/2001 | Pinches et al. |
| 7,004,326 | B1 | 2/2006 | Dai et al. |
| 2010/0018349 | A1 | 1/2010 | Manabe |
| 2015/0361523 | A1 | 12/2015 | Schuffer Ameller |
| 2016/0258036 | A1 | 9/2016 | Rautenbach |
| 2016/0298248 | A1 | 10/2016 | Hymer |

FOREIGN PATENT DOCUMENTS

| | | |
|---|---|---|
| CN | 107164633 A | 9/2017 |
| WO | 98/08585 A1 | 3/1998 |
| WO | 00/37690 A1 | 6/2000 |
| WO | 02/099144 A1 | 12/2002 |
| WO | 2012/031317 A1 | 3/2012 |
| WO | 2014/205481 A1 | 12/2014 |
| WO | 2015/081372 A2 | 6/2015 |

OTHER PUBLICATIONS

Watling, H.R. "The bioleaching of sulphide minerals with emphasis on copper sulphides—A review." Hydrometallurgy 84 pp. 81-108. (Year: 2006).*

May 20, 2019—(WO) International Search Repor tand Written Opinion—App PCT/AU2019/050383.

Chen, Yu-Wei; Yuerong Li, Mei-Fang Cai, Nelson Belzile & Zhi Dang, "Preventing oxidation of iron sulfide materials by polyethylene polyamines." Minerals Engineering 19, pp. 19-27 (Year: 2006).

Jager, Michael et al., "Branched and linear poly(ethylene imine)-based conjugates: synthetic modification, characterization, and application", Chem. Soc. Rev., 2012, 41, pp. 4755-4767.

Jan. 23, 2017—International Search Report and Written Opinion of PCT/AU2016/051024.

Nov. 26, 2015—International-Type Search Report of AU 2015904452.

Feb. 14, 2018—International Preliminary Report on Patentability of PCT/AU2016/051024.

Cordoba, E.M. et al., "Comparative kinetic study of the silver-catalyzed chalcopyrite leaching at 35 and 68° C.", International Journal of Mineral Processing, vol. 92, No. 3-4, 2009 pp. 137-143.

Hiroyoshi, N., et al., "A new reaction model for the catalytic effect of silver ions on chalcopyrite leaching in sulfuric acide solutions", Hydrometallurgy, vol. 63, No. 3, 2002, pp. 257-467.

Munoz, J.A., et al., "Silver catalyzed bioleaching of low-grade copper ores. Part III: Column reactors" < Hydrometallurgy, vol. 88, No. 1-4, 2007, pp. 35-51.

Mar. 22, 2019—(CL) Opposition to Patent Application—App 201803313.

Srinath, E.G., et al., "Bacterial Leaching of Copper from Low Grade Chalcopyrite Ores." Journal of the Indian Institute of Science. vol. 58, No. 12, pp. 567-576 (Year: 1976).

Herreros, O., et al. "Leaching of Copper Concentrates Using NaCL and Soluble Copper Contributed by the Concentrate Itself", Rev. Metal Madrid 41 (2005), pp. 384-392.

May 17, 2018—International Search Report and Written Opinion of the International Searching Authority in PCT/AU2018/050316.

Feb. 22, 2019—(WO) International Preliminary Report on Patentability—App PCT/AU2018/050316.

Lu, Z.Y., Jeffrey, M.I. and Lawson, F., "The effect of chloride ions on the dissolution of chalcopyrite in acidic solutions," Hydrometallurgy, Year 2000, 56 pp. 189-202.

Jun. 20, 2018—(AU) International-Type Search Report and Written Opinion—Australian App 2018901583.

Zhigang Yin et al., "Separation of Molybdenite from Chalcopyrite in the Presence of Novel Depressant 4-Amino-3-thioxo-3,4-dihydro-1,2,4-triazin-5(2H)-one", Minerals 2007, vol. 7, No. 8: 146.

* cited by examiner

LEACHING COPPER-CONTAINING ORES

This application is a continuation of U.S. application Ser. No. 16/153,043 filed Oct. 5, 2018 and claims priority to Australian Application 2018901583 filed May 9, 2018 and Australian Application 2018902601 filed Jul. 18, 2018, each application being incorporated by reference in its entirety.

TECHNICAL FIELD

The present invention relates to leaching copper-containing ores.

The present invention relates particularly, although not exclusively, to leaching any one or more of (a) copper-containing ores (which may be in the form of agglomerates of ore fragments), (b) concentrates of the ores, and (c) tailings of the ores or concentrates produced for example by flotation or other downstream processing of ores or concentrates.

The present invention relates particularly, although not exclusively, to leaching copper-containing sulfidic ores, such as sulfidic ores that contain copper minerals such as chalcopyrite ($CuFeS_2$) and/or enargite ($Cu_3AsS_4$). The sulfidic ores may contain other copper minerals.

The present invention relates particularly, although not exclusively, to a method of leaching copper-containing ores, particularly copper-containing sulfidic ores, using an additive to enhance dissolution of copper in the ores.

BACKGROUND ART

In the leaching of copper-containing ores (including copper-containing sulfidic ores such as chalcopyrite and/or enargite or other copper-containing sulfide minerals), the particle size of the ores is typically reduced from run-of-mine size, for example by crushing and grinding operations, to allow processing via heap leaching, vat leaching or reactor leaching options.

These leaching processes involve the application of an acid and an oxidant to dissolve copper into solution. Copper is subsequently recovered from the acidic solution by a range of recovery options including solvent extraction and electrowinning (SX/EW), cementation onto more active metals such as iron, hydrogen reduction, and direct electrowinning. The acidic solution is regenerated and recycled to leach more copper from the ores. Leaching may be assisted by the use of microorganisms.

Generally, leaching may provide lower metal recoveries than other process options for recovering copper from sulfidic ores, such as milling and flotation, that produce copper-containing concentrates that are then smelted to produce copper metal.

It is known that it is difficult to leach more than 20-40 wt. % of the total copper from chalcopyrite by heap leaching. The low copper recovery is often thought to be associated with the formation of a passive film on the surface of the chalcopyrite that may be composed of degradation products from the dissolution reaction.

The present invention was made in research and development work by a Group company of the applicant.

The present invention makes it possible to achieve higher recoveries of copper from copper-containing minerals in ores via an enhanced leaching mechanism.

The above description is not to be taken as an admission of the common general knowledge in Australia or elsewhere.

SUMMARY OF THE DISCLOSURE

The present invention is based on a realisation that leaching copper-containing ores or concentrates of the ores or tailings of the ores or concentrates produced for example by flotation or other downstream processing of ores or concentrates can be enhanced via the formation of a complex comprising (a) sulfur, that has originated from copper minerals in the ores, and (b) an additive.

In particular, although not exclusively, the present invention is based on a realisation that leaching copper-containing ores or concentrates of the ores or tailings of the ores or concentrates can be enhanced via the formation of a complex between (a) sulfur, that has originated from copper minerals in the ores, and (b) an additive that results in an increase in dissolution rates.

By way of example, the sulfur may be in a passivating layer on copper minerals, and the complex may be a complex of the additive and sulfur in the passivating layer that breaks down the passivating layer or reduces the formation of the layer and therefore allows greater access for leaching copper from copper minerals. This invention can be described as a "mechanism invention".

The present invention is also based on a realisation that a particular group of nitrogen-containing complexing agents are effective additives for the above-described leaching method. This invention can be described as an "additive-specific invention".

Mechanism Invention—Additive

In general terms, the mechanism invention is a method of leaching copper-containing ores, such as copper-containing sulfidic ores that contain copper minerals such as chalcopyrite and/or enargite, or concentrates of the ores or tailings of the ores or concentrates, that includes leaching copper-containing ores or concentrates or tailings of the ores or concentrates with a leach liquor in the presence of an additive that enhances the dissolution of copper from copper minerals in the ores and concentrates by forming a complex between (a) sulfur, that has originated from copper minerals in the ores, and (b) the additive.

The complex may comprise sulfur in a passivating layer on copper minerals and the additive, with the complex breaking down the passivating layer or reducing the formation of the layer and therefore allowing greater access for leaching copper from copper minerals.

The method may include any one of:
(a) heap or vat or tank leaching ore fragments,
(b) heap or vat or tank leaching agglomerates of ore fragments,
(c) heap or vat or tank leaching ore concentrates,
(d) heap or vat or tank leaching agglomerates of ore concentrates; and
(e) heap or vat or tank leaching tailings of the ores or concentrates produced for example in flotation or other downstream processing of ores or concentrates.

The additive may comprise a nitrogen-containing complexing agent that includes at least two nitrogen atoms spaced by two carbon atoms to permit the additive to form complexes between sulfur, that has originated from copper minerals in the ores, and the additive.

Each of the at least two nitrogen atoms in the additive may be present as a primary amine group, a secondary amine group or a tertiary amine group.

In addition to forming complexes with sulfur that has originated from copper minerals in the ores, including for example sulfur in the passivating layer on the copper minerals (including the complexes set out below), the additive may form complexes with copper(I), copper(II), iron(II), and iron(III) that has originated from the ores that enhance leaching of copper from copper minerals in the ores or concentrates, including the complexes set out below:

$Cu(X)_n^{(1+y*n)}$
$Cu(X)_n^{(2+y*n)}$
$Fe(X)_n^{(2+y*n)}$
$Fe(X)_n^{(3+y*n)}$
$AsO_4(X)_n^{(-3+y*n)}$
$Sm(X)_n^{(y*n+z)}$
$S_{(8-m)}(X)_n^{(y*n+z)}$ where X=additive; n=number of additive molecules; y=electron charge of additive; m=number of sulfur atoms in the chain; z=electron charge of the sulfur chain.

The following structures show possible complexes that can form between sulfur that has originated from copper minerals in the ores and the additive, where the additive is, for example, ethylenediamine.

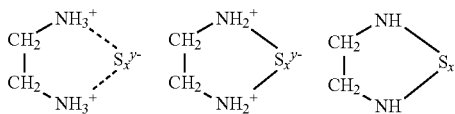

For each of the complexes, the metal ion or sulfur is derived from the dissolution of the copper minerals in the ores or concentrates or tailings of the ores or concentrates, such as chalcopyrite or enargite.

The complex may form a ring or chain structure.

The formation of these complexes may be controlled and/or enhanced by the addition of an acid, such as sulfuric acid, and an oxidant or reductant.

The applicant believes that these complexes are preferentially formed over existing intermediary phases and thereby break down or reduce the formation of passivating layers on the copper mineral surfaces and therefore allow greater access for leaching copper from the minerals in the ores.

The applicant also believes that the additive may react directly with the sulfur from the mineral to enhance leaching via reducing the activation energy, i.e. have a catalytic effect.

Additive-Specific Invention

The additives described below have been found to be suitable additives for the mechanism invention.

In general terms, the additive-specific invention is a method of leaching copper-containing ores, such as copper-containing sulfidic ores that contain copper minerals such as chalcopyrite and/or enargite, or concentrates of the ores, that includes leaching copper-containing ores or concentrates or tailings of the ores or concentrates with a leach liquor in the presence of a nitrogen-containing organic complexing additive that forms a complex between sulfur, that has originated from copper minerals in the ore, and the additive.

As noted above, the complex may comprise sulfur in a passivating layer on copper minerals and the additive, with the complex breaking down the passivating layer or reducing the formation of the layer and therefore allowing greater access for leaching copper from copper minerals during the method.

It is preferred that the additive be sufficiently water soluble to be able to enhance copper extraction into the leach solution.

The additive may be a degradation product that forms under the conditions of the leach and is an effective additive in the terms of the invention.

By way of example, the degradation product may be a degradation product of another said additive.

The nitrogen-containing complexing agent may include at least two nitrogen atoms.

Each of the at least two nitrogen atoms in the additive may be present as a primary amine group, a secondary amine group or a tertiary amine group.

The possible interaction of sulfur that has originated from copper minerals in the ores with the at least two nitrogen atoms in the additive may be via the lone pair on each of the nitrogen atoms being involved in pit-dn bonding with the adjacent sulfur atom. Alternatively, this may be via ionic interaction or a combination of both.

It is preferred that the nitrogen atoms of the additive are not significantly sterically hindered. Minimising steric hindrance assists the formation of a sufficiently strong interaction (e.g. pit-dn bonding, ionic interaction or a combination of both) between the sulfur from the ore and the nitrogen atoms in the additive.

The nitrogen-containing complexing agent may include at least two nitrogen atoms spaced by two carbon atoms to permit the additive to form the complex.

The additive may be a compound that contains the following molecular scaffold or a polymer that contains the molecular scaffold repeated through the polymer:

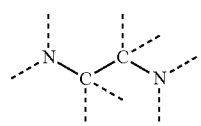

(I)

wherein, the two nitrogen atoms are each independently substituted or unsubstituted, each nitrogen atom is selected from the group consisting of a primary amine group, a secondary amine group, a tertiary amine group, the carbon atoms may each be substituted or unsubstituted;

the bonds between the nitrogen atoms and carbon atoms in the scaffold may be single bonds or multiple bonds; and the bonds between the two carbon atoms in the scaffold may be single bonds or multiple bonds.

Examples of possible additive compound structures include the following:

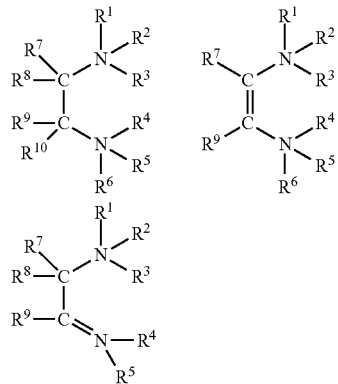

wherein, the groups $R^1$ to $R^{10}$ may each be independently selected from the group including alkyl (such as $C_1$ to $C_5$ alkyl), alkenyl (such as $C_2$ to $C_5$ alkenyl), alkynyl (such as $C_2$ to $C_5$ alkynyl), OH, =O, alkyloxy groups (such as $C_1$ to $C_5$ alkyloxy groups), alkenyloxy groups (such as $C_2$ to $C_5$ alkynyloxy groups), alkynyloxy groups (such as $C_2$ to $C_5$ alkynyloxy groups), C(=O)R (where R is alkyl, alkenyl or alkynyl), C(O)OH, C(O)OR (where R is alkyl, alkenyl or alkynyl), OC(=O)R (where R is alkyl, alkenyl or alkynyl), amino, alkylamino (such as $C_1$ to $C_5$ alkyl), alkenylamino (such as $C_2$ to $C_5$ alkenylamino), alkynylamino (such as $C_2$ to $C_5$ alkynylamino), C(O)NH$_2$, C(O)NHR (where R is alkyl, alkenyl or alkynyl), C(O)NR$_2$ (where R is alkyl, alkenyl or alkynyl).

The additive may be a compound of the formula (II) or a polymer formed from two or more monomers of the formula (II):

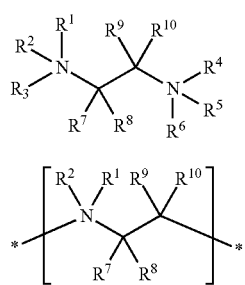

wherein, in formula (II) and (III), $R^1$, $R^2$, $R^3$, $R^4$, $R^5$ and $R^6$ may each be independently selected from a lone pair electron, H, alkyl groups (such as $C_1$ to $C_5$ alkyl groups), alkenyl groups (such as $C_2$ to $C_5$ alkenyl groups), alkynyl groups (such as $C_2$ to $C_5$ alkynyl groups), and alkylamino groups (such as $C_1$ to $C_5$ alkylamino groups), or the substituents on each of the two nitrogens together form an alkyl or alkynyl group that connect the two nitrogens to form a ring (e.g. the substituents together form a one or two carbon connecting the nitrogens to form a ring);

$R^7$, $R^8$, $R^9$ and $R^{10}$ may each be independently selected from H, alkyl (such as $C_1$ to $C_5$ alkyl), alkenyl (such as $C_2$ to $C_5$ alkenyl), alkynyl (such as $C_2$ to $C_5$ alkynyl), OH, alkyloxy groups (such as $C_1$ to $C_5$ alkyloxy groups), alkenyloxy groups (such as $C_2$ to $C_5$ alkynyloxy groups), alkynyloxy groups (such as $C_2$ to $C_5$ alkynyloxy groups), C(=O)R (where R is alkyl, alkenyl or alkynyl), C(O)OH, C(O)OR (where R is alkyl, alkenyl or alkynyl), OC(=O)R (where R is alkyl, alkenyl or alkynyl), amino, alkylamino (such as $C_1$ to $C_5$ alkyl), alkenylamino (such as $C_2$ to $C_5$ alkenylamino), alkynylamino (such as $C_2$ to $C_5$ alkynylamino), C(O)NH$_2$, C(O)NHR (where R is alkyl, alkenyl or alkynyl), C(O)NR$_2$ (where R is alkyl, alkenyl or alkynyl), or $R^7$ and $R^8$ together and/or $R^9$ and $R^{10}$ together may be selected from =O, =NH or =NH (where R is alkyl, alkenyl or alkynyl);

and in formula (III), $R^1$ or $R^2$ are each independently selected from the groups defined for R1 and R2 above or are connected to another monomer of formula (II).

Examples of suitable additives include ethylenediamine, polyethylenimine, imidazole, diethylenetriamine, triethylenetetramine, tetraethylenepentamine, 1,2-diaminopropane, and 2,3-butanediamine A large number of other additives exist that fulfil the criteria of formula (II) and formula (III).

Additive Addition—Mechanism/Additive-Specific

The concentration of the additive may be up to 10 g/L, typically up to 5 g/L, typically up to 2.5 g/L, typically up to 1.5 g/L, typically up to 1.25 g/L, and more typically up to 1 g/L, in the leach liquor.

The method may include adding the additive to the leach liquor continuously or periodically during the method to maintain a required concentration during the method.

The method of addition may be to the ores or concentrates of the ores or tailings of the ores or concentrates prior to leaching.

The method for addition may be to agglomerates of ore fragments prior to leaching.

For example, the additive may be added while forming agglomerates of ore fragments, as described further below.

In a situation where the method recycles leach solution, optionally after regenerating leach liquor from the leach step, the method may include adjusting the concentration of the additive in the regenerated leach liquor to maintain the concentration.

Leaching—Generally—Mechanism/Additive-Specific

Leaching may be any suitable option for leaching (a) ore fragments or ore concentrates or tailings of the ores or concentrates or (b) agglomerates of ore fragments or ore concentrates or tailings of the ores or concentrates.

For example, leaching may be vat or tank leaching.

By way of further example, which is of particular interest to the applicant, leaching may be heap leaching agglomerates of ore fragments or ore concentrates or tailings of the ores or concentrates.

Leaching may include supplying a leach liquor to a heap of agglomerates from an agglomeration step and allowing the leach liquor to flow through the heap and leach copper from agglomerates and collecting leach liquor from the heap, processing the leach liquor and recovering copper from the liquor.

The term "fragment" is understood herein to mean any suitable size of mined or treated (e.g. crushed) material having regard to materials handling and processing capabilities of the apparatus used to carry out the method. It is also noted that the term "fragment" as used herein may be understood by some persons skilled in the art to be better described as "particles". The intention is to use both terms as synonyms.

The leach liquor may include microorganisms to assist leaching of copper.

The microorganisms may be one or more than one of psychrotolerant or mesophilic or thermophilic (moderate or extreme) bacteria or archaea. The microorganisms may be acidophilic bacteria or archaea. The microorganisms may be thermophilic acidophiles.

The leach liquor may contain any suitable chemical oxidants, such as O$_2$/SO$_2$, pyrolusite, permanganate ions, ferric ions, peroxide ions, and chlorate ions.

Leaching may include controlling the temperature to be less than 100° C., typically less than 85° C., typically less than 75° C., typically less than 65° C., typically less than 60° C., typically less than 55° C., and more typically less than 50° C.

Leaching may include controlling the leach temperature to be at least 10° C., typically at least 20° C., typically at least 30° C., typically at least 40° C., and more typically at least 50° C.

Leaching may include controlling the oxidation potential of the leach liquor during an active leaching phase of the step to be less than 900 mV, typically less than 850 mV, typically less than 800 mV, typically 500 to 750 mV, more typically in a range of 600 to 750 mV, all potentials being with respect to the standard hydrogen electrode.

Leaching and oxidation potential may be assisted by the addition of microorganisms capable of oxidizing ferrous ions, sulfides, polysulfides and sulfur.

It is noted that the oxidation potential will change during leaching and is likely to be higher when much of the copper has been leached and the reference to "active leaching phase" is intended to acknowledge this potential change.

Leaching may include controlling the pH of the leach liquor to be less than 2.5, typically less than 2.0, typically less than 1.8, and typically less than 1.5.

Leaching may include controlling the pH of the leach liquor to be greater than 0.5, typically greater than 1.

Leaching may include recovering copper from the leach liquor in downstream copper recovery steps.

The leach liquor may be regenerated and recycled to the leach.

Leaching may include adjusting the concentration of the additive in the regenerated leach liquor to maintain the concentration.

The concentration adjustment may include adding the additive to the regenerated leach liquor to maintain the concentration.

The concentration adjustment may include removing the additive from the regenerated leach liquor to maintain the concentration.

The method may also include recovering the leached metal as a metal product. Typically, this step includes recovering the leached metal from solution in pregnant leach liquor.

In general terms, the advantages of the invention include providing an opportunity for microorganism-assisted and/or chemically assisted leaching of copper minerals in copper-containing ores, particularly low grade ores (i.e. typically less than 2.0 wt. % copper, typically less than 1.5% copper, typically less than 1.0% copper), at relatively low temperatures and at comparatively low operating costs with high recoveries.

The following description focuses on particular embodiments of heap leaching, noting that the invention is not confined to heap leaching and extends to vat and tank leaching on copper ores and copper concentrates or tailings of the ores or concentrates.

The method may include an agglomeration step for forming agglomerates of ore fragments for heap leaching.

The agglomeration step may include adding the additive during the step.

The applicant has found that in situations where the additive is a polymer-like additive, such as longer chain organic substances, such as polyethylenimine (PEI), it may be preferred to include the additive in agglomerates of ore fragments rather than by adding the additive to the leach liquor.

The agglomeration step may include:
  (a) forming a PEI solution having a pH greater than pH 4.5;
  (b) optionally heating the solution to at least 50° C. to speed up the dissolution/dilution of the PEI; and
  (c) adding the PEI solution to ore fragments at the start of the agglomeration step before other additions, such as acids/raffinate/etc, described below to the agglomeration step.

The agglomeration step may include forming the PEI solution while ensuring that the solution does not contain constituents that can cause precipitation and/or polymerization of PEI such as ferric ions.

The agglomeration step may include mixing together an acid, typically sulfuric acid but could also be dilute hydrochloric, with copper-containing ore fragments, such as fragments containing chalcopyrite. The added acid dose rate may be less than 100 kg $H_2SO_4$/dry t ore, typically less than 50 kg $H_2SO_4$/dry t ore, typically less than 30 kg $H_2SO_4$/dry t ore, and may be less than 10 kg $H_2SO_4$/dry t ore or less than 5 kg $H_2SO_4$/dry t ore. Typically, the acid dose rate is 0.5-10 kg $H_2SO_4$/dry t ore.

The agglomeration step may include mixing together pregnant leach solution or raffinate with copper-containing ore fragments, such as fragments containing chalcopyrite.

The agglomeration step may include mixing microorganisms that can assist leaching with copper-containing ore fragments, such as fragments containing chalcopyrite. The microorganisms may be as described above. Specifically, the microorganisms may be one or more than one of mesophilic, thermophilic (moderate or extreme) or psychrotolerant bacteria or archaea. The microorganisms may be acidophilic bacteria or archaea. The microorganisms may be thermophilic acidophiles.

The agglomeration step may include simultaneously mixing and agglomerating fragments.

The agglomeration may include mixing fragments in one-step and then agglomerating the mixed fragments in a subsequent step. There may be overlap between the mixing and agglomeration steps.

The method may include reducing the size of the mined ore prior to agglomeration.

By way of example, the method may include crushing the mined ore prior to agglomeration. The mined ore may be crushed using any suitable means.

The method may include crushing mined ore in a primary crushing step prior to the agglomeration step.

The term "primary crushing" is understood herein to mean crushing ore to a top size of 250 to 150 mm in the case of copper-containing ores where the copper is in the form of sulfides. It is noted that the top size may be different for ores containing different valuable metals.

The method may include crushing mined ore in a primary crushing step and then a secondary and possibly tertiary and possibly quaternary crushing step prior to agglomeration.

The invention also provides a heap of material, with the material including the above-described agglomerates.

The invention also includes a method of heap leaching that includes:
  (a) forming a heap of material, with the material including the above-described agglomerates; and
  (b) leaching valuable metal from the ore in the heap with a leach liquor.

Heap leaching may include recovering copper from the leach liquor in downstream copper recovery steps.

The leach liquor may be regenerated and recycled to the heap.

The leaching step may include adding the additive during the step.

The method may also include recovering the leached metal as a metal product. Typically, this step includes recovering the leached metal from solution in pregnant leach liquor.

The method may include forming heaps of the copper-containing ores or concentrates.

BRIEF DESCRIPTION OF THE DRAWINGS

The present invention is described further with reference to the accompanying drawings of which.

DESCRIPTION OF EMBODIMENT

The following description is in the context of heap leaching agglomerates of copper-containing ore fragments.

It is noted that not all of the experimental work that has been carried out is reported in the specification and that the overall results of the work are positive and indicate invention is applicable to tank, vat and heap leaching.

Further to the preceding paragraph, it is noted that the invention extends to heap, vat and tank leaching copper-containing ores that are in the form of fragments or in the form of agglomerates of fragments.

It is also noted that the invention also extends to heap, vat, and tank leaching concentrates of copper-containing ores, with the ore concentrates being in any suitable form, including unagglomerated and agglomerated forms.

It is also noted that the invention also extends to heap or vat or tank leaching tailings of the ores or concentrates produced for example in flotation or other downstream processing of ores or concentrates.

As noted above, the invention comprises leaching copper-containing ores or concentrates of the ores or tailings of the ores or concentrates with a leach liquor in the presence of an additive that enhances the dissolution of copper from copper minerals in the ores and concentrates by forming a complex between (a) sulfur, that has originated from copper minerals in the ore, and (b) the additive. Nitrogen-containing organic complexing additives are specific examples of the additive.

Figure 1:
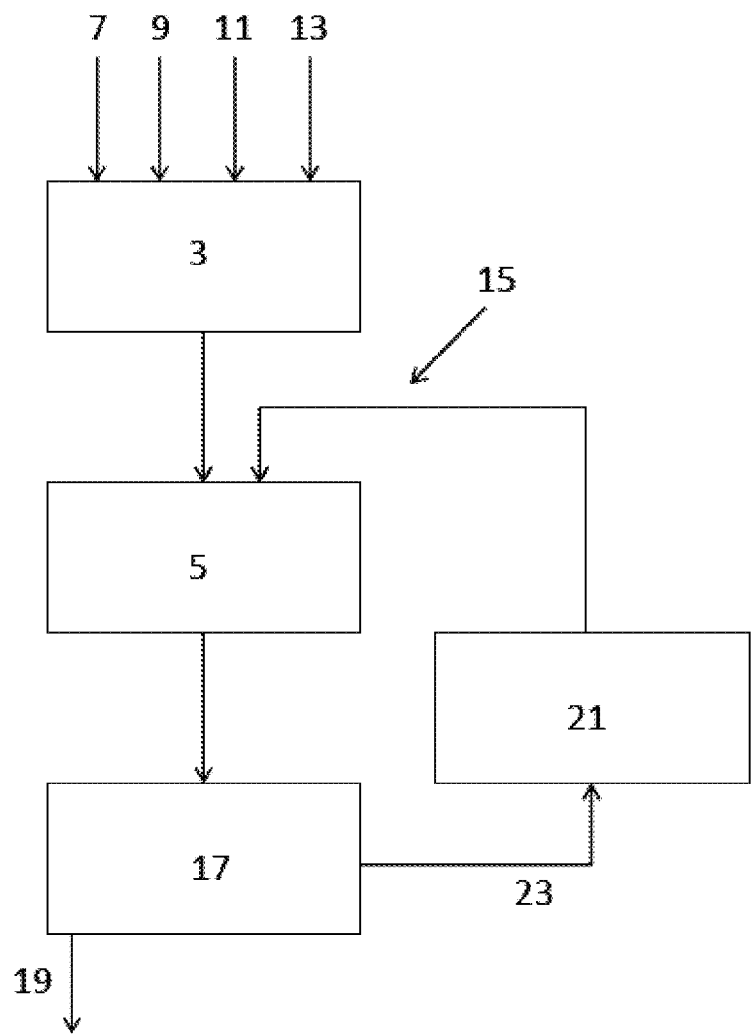
FIG. 1 illustrates the steps in one embodiment of a method of heap leaching agglomerates of fragments of copper-containing ore that contains chalcopyrite and/or enargite with a leach liquor containing an additive in accordance with the present invention.

The flow sheet of FIG. 1 shows the steps in one embodiment of a method of heap leaching agglomerates of fragments of copper-containing ore that contains chalcopyrite and/or enargite with a leach liquor containing an additive in accordance with the invention.

The method includes the steps of forming agglomerates of copper containing ore in an agglomeration station 3, forming a heap 5 from the agglomerates, supplying a leach liquor 15 to the heap 5 and taking copper into solution, collecting leach liquor after it has passed through the heap, recovering copper from solution in the leach liquor from the heap in a copper recovery circuit 17, for example by solvent extraction, and regenerating the leach liquor from the heap and recycling the regenerated leach liquor to the heap.

With reference to FIG. 1, the following feed materials are transferred to the agglomeration station 3 and are mixed together and form agglomerates:

(a) fragments of copper containing ore that includes chalcopyrite and/or enargite that have been crushed to a suitable particle size distribution, identified by the numeral 7 in the Figure;

(b) optionally an activation agent, such as silver, in this embodiment as a silver solution (but could be in a solid form), typically having an added concentration of silver of less than 5 g silver per kg copper in the ore in the agglomerates, identified by the numeral 9 in the Figure;

(c) an acid, typically sulfuric acid, identified by the numeral 11 in the Figure in any suitable concentration; and (d) microorganisms, identified by the numeral 13 in the Figure, of any suitable type and in any suitable concentration.

The agglomerates produced in the agglomeration station 3 are subsequently used in the construction of the heap 5.

For example, the agglomerates produced in the agglomeration station 3 may be transferred directly to a heap construction site. Alternatively, the agglomerates may be stockpiled and used as required for a heap. The agglomeration station 3 and the heap 5 are typically in close proximity. However, this is not essential and may not be the case.

By way of example only, the heap may be a heap of the type described in International publication WO2012/031317 in the name of the applicant and the disclosure of the heap construction and leaching process for the heap in the International publication is incorporated herein by cross-reference.

In a heap leaching operation, copper in the chalcopyrite and other copper-containing minerals in the agglomerates is leached from the agglomerates in the heap 5 via the supply of the leach liquor 15 and is taken into solution in the leach liquor as the leach liquor passes through the heap 5.

The leached copper is recovered from the leach liquor in the downstream copper recovery circuit 17.

The recovered copper 19 is transferred for further processing and the leach liquor 23 is transferred to and regenerated in a regeneration circuit 21 and recycled to the heap 5 as leach liquor 15 to leach more copper from the chalcopyrite and other copper-containing minerals in the agglomerates in the heap 5.

The agglomeration station 3 may be any suitable construction that includes a drum, conveyor (or other device) for mixing the feed materials for the agglomerates and agglomerating the feed materials. The agglomeration conditions in the agglomeration station 3 are selected to form agglomerates of the required size and mechanical properties for the heap 5.

Mixing and agglomerating the feed materials for the agglomerates may occur simultaneously. Alternatively, mixing the feed materials may be carried out first and agglomerating (for example initiated by the addition of the acid) may be carried out after mixing has been completed to a required extent. Moreover, the timing of adding and then mixing and agglomerating feed materials may be selected to meet the end-use requirements for the agglomerates. For example, it may be preferable in some situations to start mixing fragments containing chalcopyrite and then adding silver in a solution or in a solid form of silver, acid, and microorganisms progressively in that order at different start and finish times in the agglomeration step. By way of particular example, it may be preferable in some situations to start mixing fragments containing chalcopyrite and then adding silver in a solution or in a solid form and acid together, and then adding microorganisms at different start and finish times in the agglomeration step.

The additives of the invention may be added to the leach liquor 15 in the required concentrations. Typically, the concentration of the additive is up to 10 g/L, up to 5 g/L, up to 2.5 g/L, up to 1.5 g/L, up to 1.25 g/L, or up to 1 g/L, in the leach liquor.

Alternatively, or in addition, the additives of the invention may be added during forming agglomerates in the agglomeration station 3.

The applicant has found that in situations where the additive is a polymer-like additive, such as longer chain organic substances, such as polyethylenimine (PEI), it may be preferred to add the additive while forming agglomerates in the agglomeration station 3 rather than adding the additive to leach liquor.

For example, one specific sequence of steps that has been found to be successful is as follows:

Form a PEI solution of pH greater than 4.5.
Ensure that the makeup solution does not contain constituents that can cause the precipitation/polymerization of the PEI.
Optionally heat the solution to at least 50° C. to speed up the dissolution/dilution of the PEI.
Add the PEI solution at the start of agglomerating ore fragments before any acids/raffinate/etc. are added.

As indicated above, a Group company of the applicant has carried out leach testing to investigate the impact of a number of additives in leach liquors on chalcopyrite mineral samples and chalcopyrite/enargite ores.

The leach tests are described in the Examples below.

EXAMPLES

As described above, test work conducted by a Group company of the applicant has shown that additives in the form of a nitrogen-containing organic complexing agent comprising two nitrogen atoms spaced by two carbon atoms can be used to enhance the dissolution of copper from copper-containing ores.

The additives tested include ethylenediamine, polyethylenimine, imidazole, bipyridyl, phenanthroline, 8-aminoquinoline, cysteine, glycine, arginine, picoline, putrescine, and spermidine.

The work has shown that additives ethylenediamine, polyethylenimine, and imidazole can be used to enhance the dissolution of copper from copper minerals in copper-containing ores.

Based on the test work and the experience of the inventors, it is expected that other compounds comprising at least two nitrogen atoms spaced by two carbon atoms, in particular compounds which are able to form a complex with sulfur that has originated from copper minerals in the ore, such as a complex with sulfur in a passivating layer on copper minerals in the ore, would have the same effect.

The test work using additive-containing liquor was conducted in small scale leaching reactors.

The following results were obtained with low grade chalcopyrite mineral samples containing greater than 90% chalcopyrite. Low grade describes ores containing less than 2 wt. % copper, this material was a mixture of chalcopyrite and enargite, plus some background secondary copper sulfide minerals.

1 Reactor Test Work
1.1 Experimental Procedure

Reactor leaching tests were all conducted at a pH less than 1.8, typically around 1.2. The oxidation potential of the solution was maintained at approximately 700 mV determined with respect to the standard hydrogen electrode to simulate conditions that may be seen when leaching copper ores. The examples in FIGS. 2, 3 and 4 involved the leaching of a chalcopyrite mineral sample containing approximately 90% chalcopyrite mineral, with the remainder being non-reactive gangue minerals. The copper grade in the sample was 29%. The initial leach solution was an acidified iron solution at ~2 g/L Fe(III) added as a sulfate. These tests were maintained at 50° C. In these methods, additives ethylenediamine, polyethylenimine, and imidazole were tested separately. Specifically, 1 g/L of one of each additive was added to the start of each test.

1.2 Impact of Additives

Figure 2:
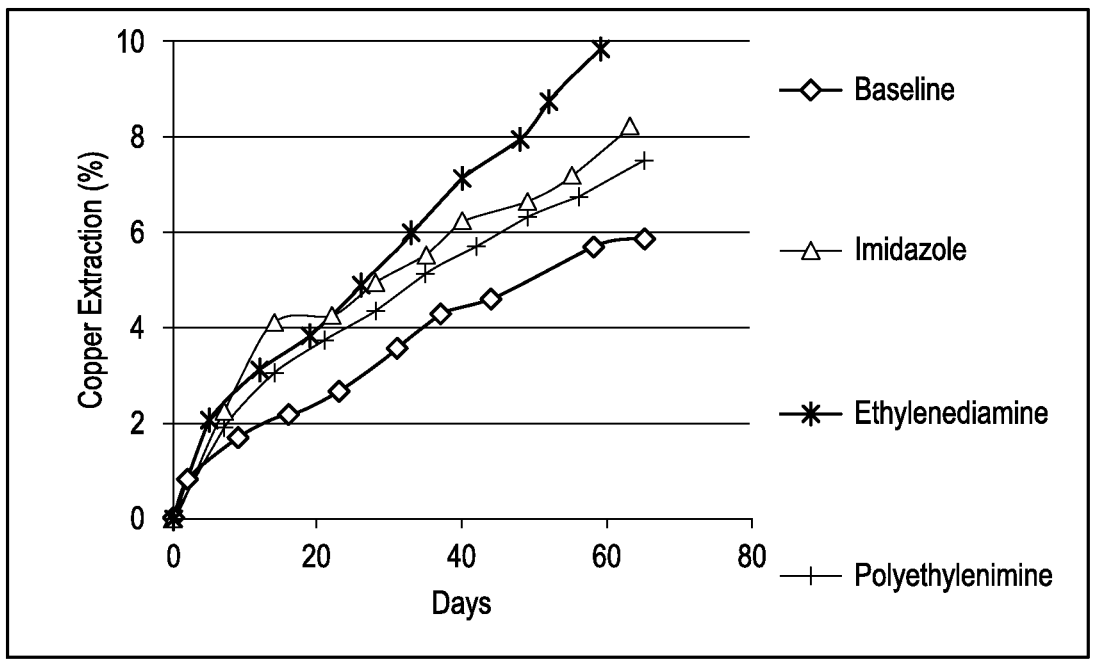
FIG. 2 illustrates the enhancement of copper dissolution from relatively pure chalcopyrite mineral grains with the addition of examples of additives in accordance with the invention, with this improvement resulting in copper extraction being higher than the baseline conditions where no additive was added to the test.

FIG. 2 is a graph that depicts copper extraction profiles (% extraction versus leach days) for chalcopyrite mineral samples leached with leach liquor containing additives ethylenediamine, polyethylenimine, and imidazole. The Figure also includes a copper extraction profile for a baseline test with the same leach liquor without an additive. FIG. 2 shows that there was an improvement observed for the leaching of chalcopyrite minerals with leach liquors in tests with the additives ethylenediamine, polyethylenimine, and imidazole compared to the results in the baseline test.

1.3 Comparative Examples Showing Compounds that Do Not Improve Leaching

Figure 3:
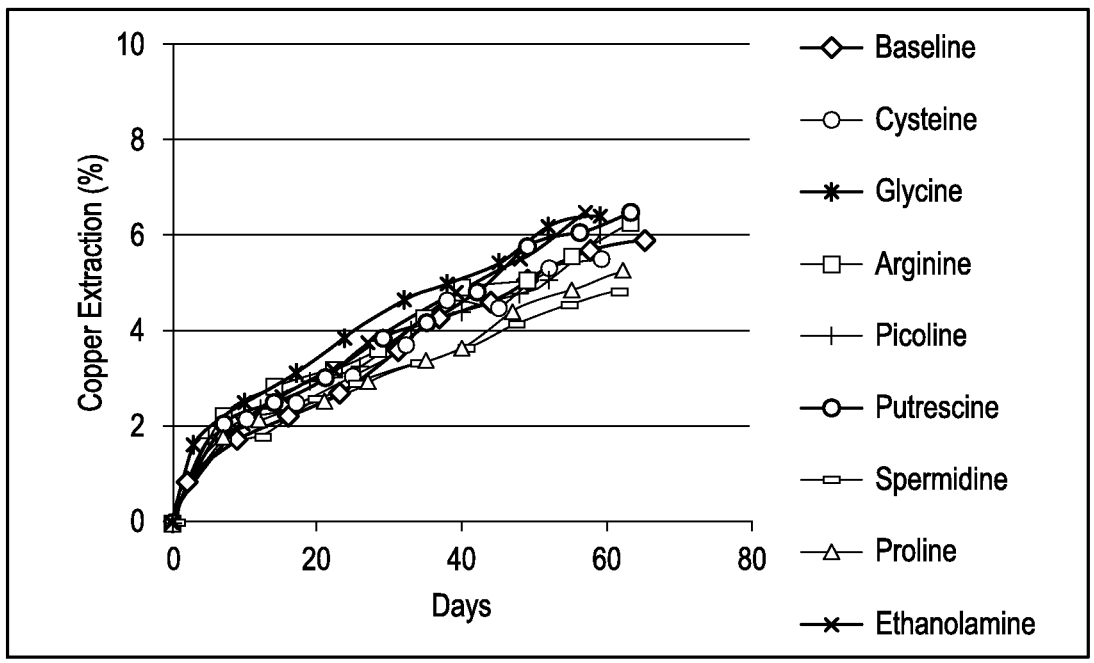
FIG. 3 illustrates cases where no enhancement of copper dissolution occurred from relatively pure chalcopyrite mineral grains with the addition of samples of additives that do not meet the requirements of the additives in accordance with the invention.

FIG. 3 is a graph that depicts copper extraction profiles for chalcopyrite mineral samples leached with leach liquors in tests with the additives cysteine, glycine, arginine, picoline, putrescine, spermidine, proline and ethanolamine. The Figure also includes a copper extraction profile for a baseline test with the same leach liquor without an additive. The Figure shows that there was no improvement observed with the leach liquors containing the additives.

Figure 4:
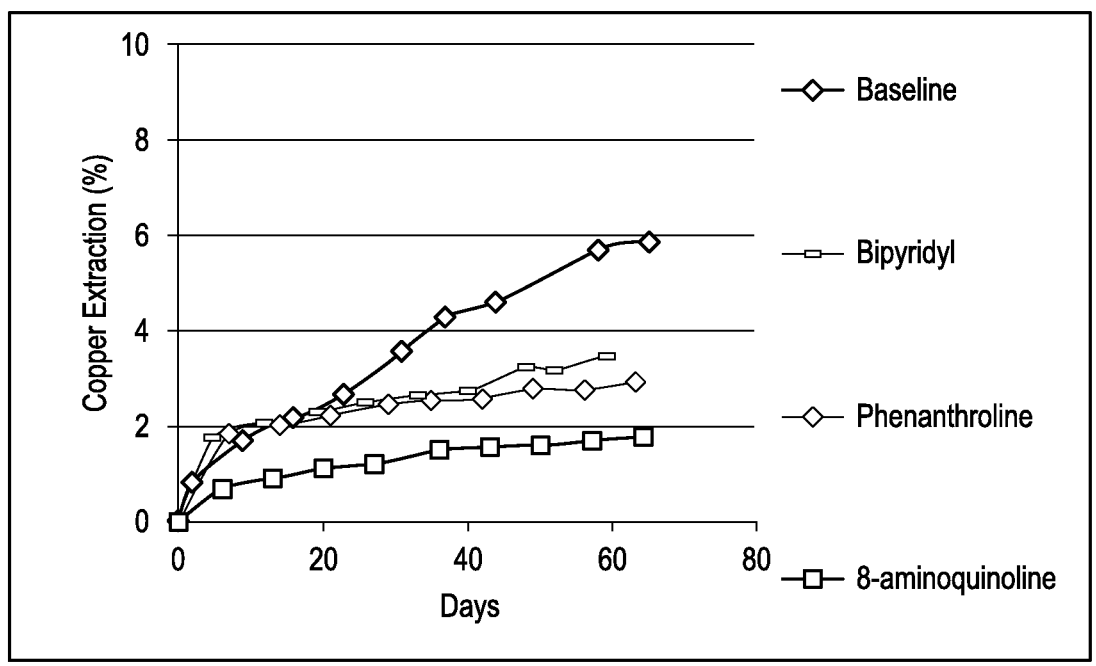
FIG. 4 illustrates cases where a negative enhancement of copper dissolution occurred from relatively pure chalcopyrite mineral grains with the addition of samples of additives that do not meet the requirements of the additives in accordance with the invention.

FIG. 4 is a graph that depicts copper extraction profiles for chalcopyrite mineral samples leached with leach liquors in tests with additives bipyridyl, phenanthroline, and 8-aminoquinoline. The Figure also includes a copper extraction profile for a baseline test with the same leach liquor without an additive. The Figure shows that there was a negative impact on leaching with the leach liquors containing the additives.

2 Column Test Work 2.1 Experimental Procedure

Column leaching tests were all conducted at a pH of less than 1.8, typically around 1.2. The examples in FIGS. 5, 6, 7 and 8 involved the leaching of a chalcopyrite and enargite ore sample containing approximately 1.3 wt. % copper and 0.07 wt. % arsenic, with approximately 8 wt. % pyrite and the remainder being non-sulfide gangue minerals. The initial leach solution was an acidified 5 g/L ferric iron solution (in the sulfate form). Iron and sulfur oxidizing moderate thermophile bacteria were added to maintain the oxidation potential between 650 and 700 mV determined with respect to the standard hydrogen electrode. In these methods, 1 g/L of the additive ethylenediamine was added at the start of each test.

2.2 Impact of Additive

Figure 5:
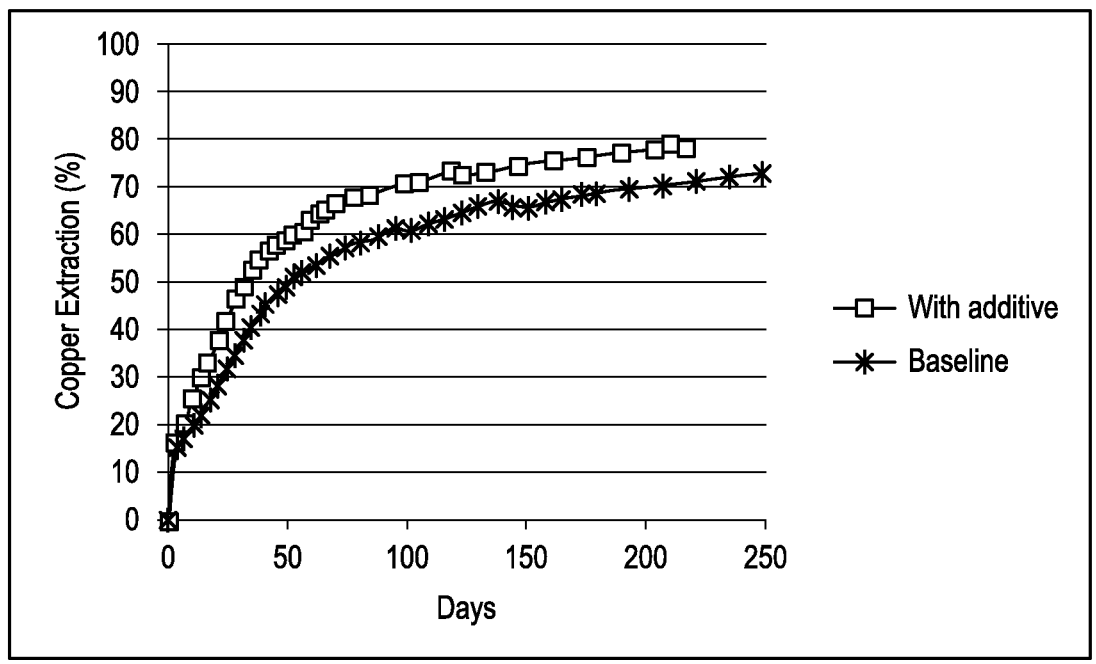
FIG. 5 illustrates the enhancement of copper dissolution from a low copper grade (<1.5 wt. %) ore sample leached at 50° C. with the addition of examples of additives in accordance with the invention, with this improvement resulting in copper extraction being higher than the baseline conditions where no additive was added to the test.

FIG. 5 is a graph that depicts copper extraction profiles for a chalcopyrite/enargite ore sample leached with (red squares) and without (blue crosses) the addition of the additive ethylenediamine at 50° C. The Figure also includes a copper extraction profile for the same leach liquor without an additive.

Figure 6:
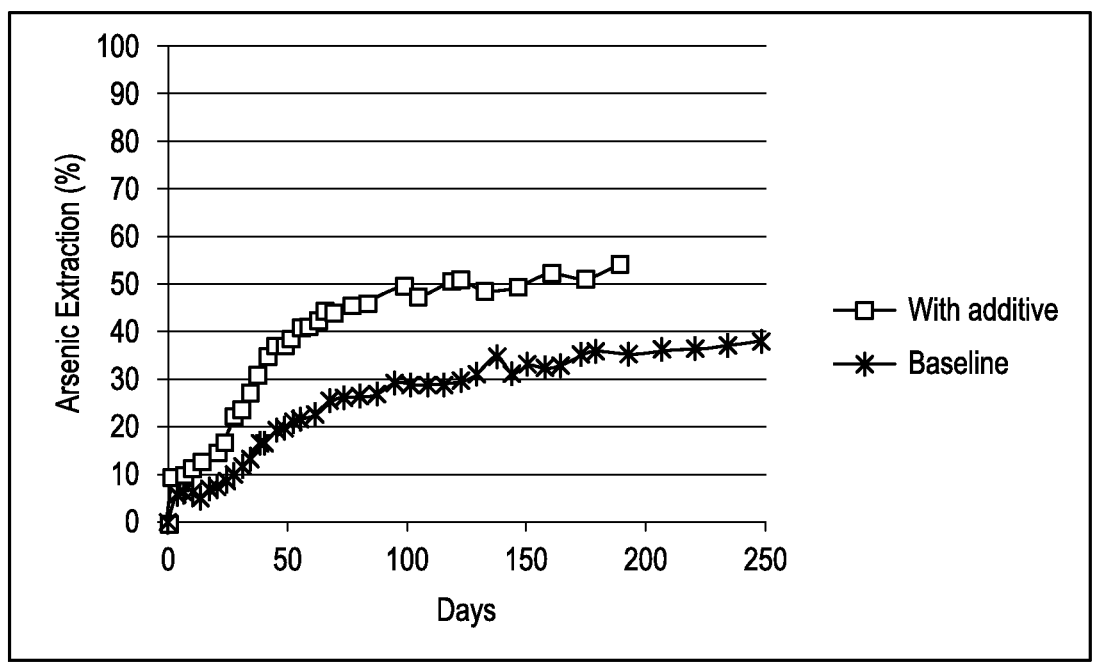
FIG. 6 illustrates the enhancement of arsenic dissolution from a low copper grade (<1.5 wt. %) ore sample leached at 50° C. with the addition of examples of additives in accordance with the invention, with this improvement resulting in arsenic extraction being higher than the baseline conditions where no additive was added to the test.

FIG. 6 is a graph that depicts arsenic extraction profiles for a chalcopyrite/enargite ore sample leached with (red squares) and without (blue crosses) the addition of the additive ethylenediamine at 50° C. The Figure also includes an arsenic extraction profile for the same leach liquor without an additive.

Figure 7:
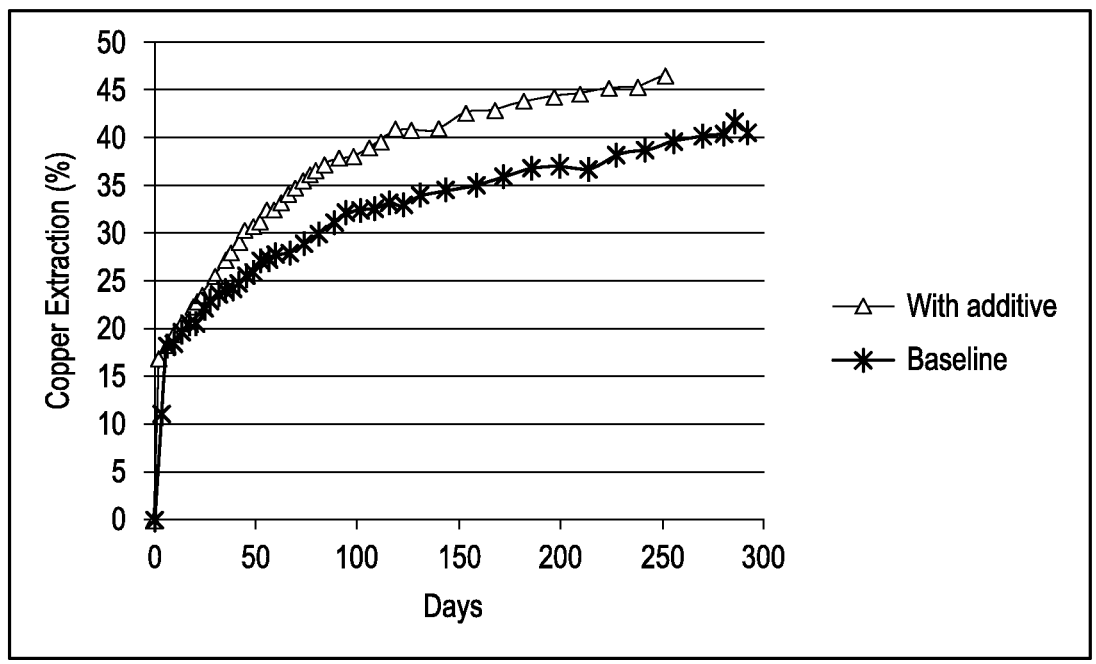
FIG. 7 illustrates the enhancement of copper dissolution from a low copper grade (<1.5 wt. %) ore sample leached at 30° C. with the addition of examples of additives in accordance with the invention, with this improvement resulting in copper extraction being higher than the baseline conditions where no additive was added to the test.

FIG. 7 is a graph that depicts copper extraction profiles for a chalcopyrite/enargite ore sample leached with (green triangles) and without (blue crosses) the addition of the additive ethylenediamine at 30° C. The Figure also includes a copper extraction profile for the same leach liquor without an additive.

Figure 8:
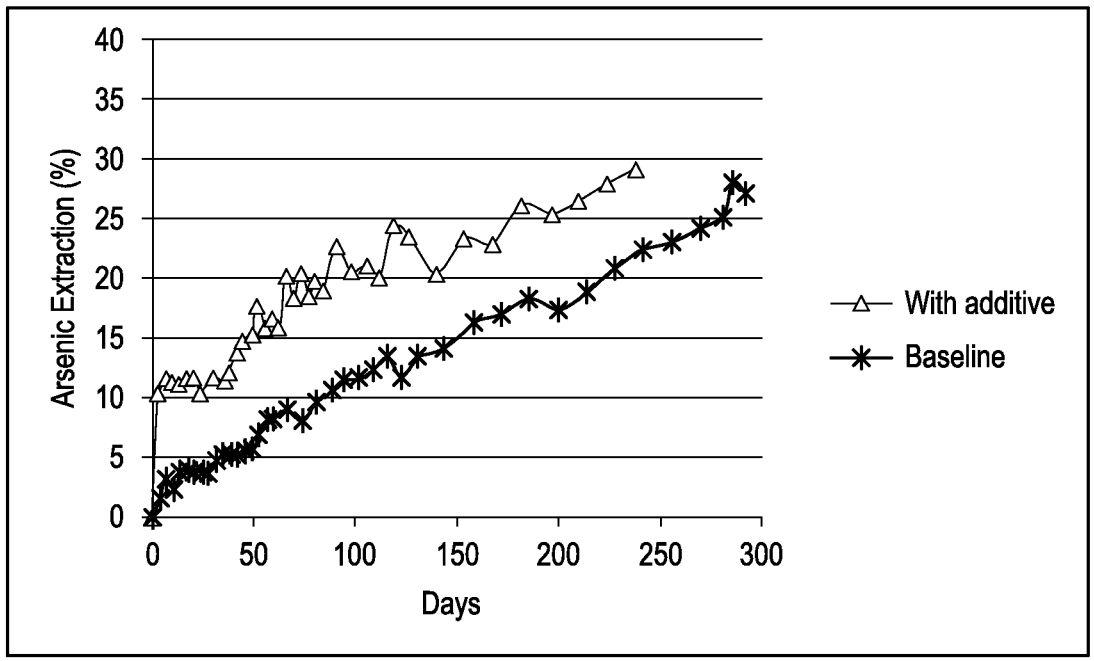
FIG. 8 illustrates the enhancement of arsenic dissolution from a low copper grade (<1.5 wt. %) ore sample leached at 30° C. with the addition of examples of additives in accordance with the invention, with this improvement resulting in arsenic extraction being higher than the baseline conditions where no additive was added to the test.

FIG. 8 is a graph that depicts arsenic extraction profiles for a chalcopyrite/enargite ore sample leached with (green triangles) and without (blue crosses) the addition of the additive ethylenediamine at 30° C. The Figure also includes a copper extraction profile for the same leach liquor without an additive.

It is evident from each of FIGS. 5-8 that the additive ethylenediamine had a positive impact on leaching the chalcopyrite/enargite ore samples, with improvements observed in each Figure compared to the baseline results.

Figure 9:
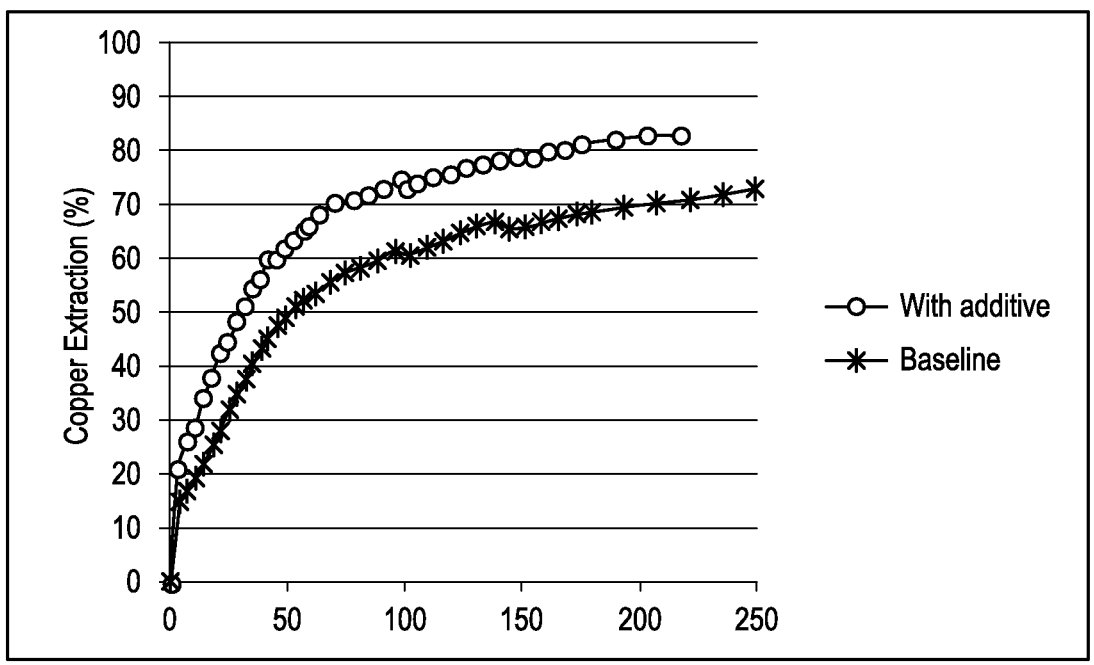
FIG. 9 is a graph of copper extraction profiles for a chalcopyrite/enargite ore sample leached with and without the addition of the additive polyethylenimine at 50° C.

FIG. 9 is a graph that depicts copper extraction profiles for a chalcopyrite/enargite ore sample leached with (orange circles) and without (blue crosses) the addition of the additive polyethylenimine at 50° C. The Figure also includes a copper extraction profile for the same leach liquor without an additive.

Figure 10:
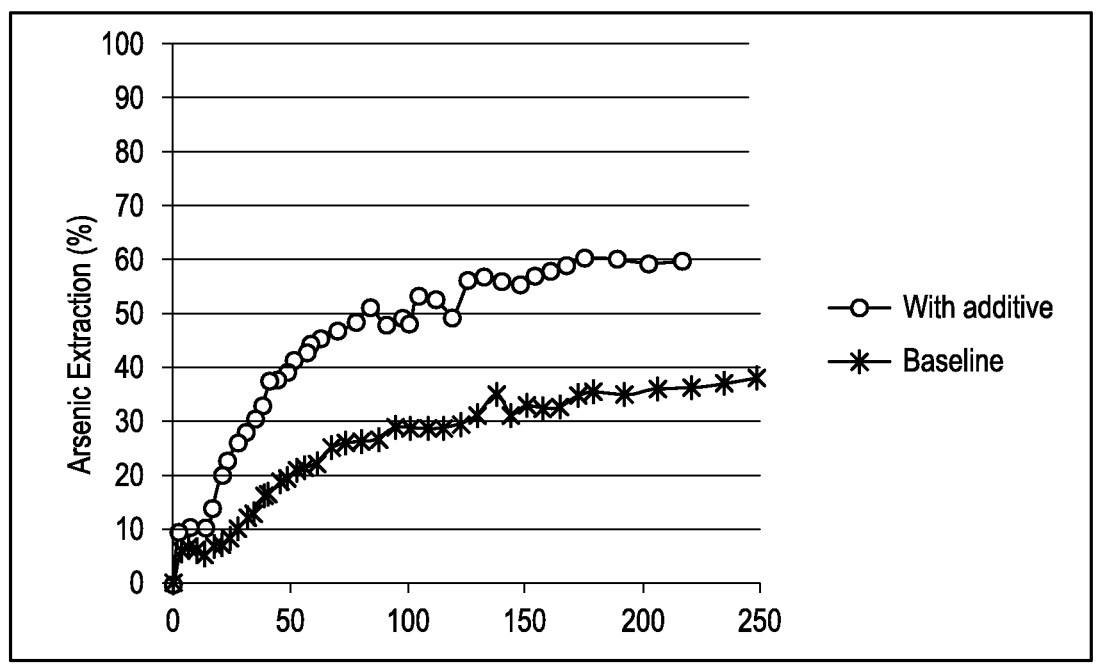
FIG. 10 is a graph of arsenic extraction profiles for a chalcopyrite/enargite ore sample leached with and without the addition of the additive polyethylenimine at 50° C.

FIG. 10 is a graph that depicts arsenic extraction profiles for a chalcopyrite/enargite ore sample leached with (orange circles) and without (blue crosses) the addition of the additive polyethylenimine at 50° C. The Figure also includes an arsenic extraction profile for the same leach liquor without an additive.

It is evident from each of FIGS. 9-10 that the additive polyethylenimine had a positive impact on leaching the chalcopyrite/enargite ore samples, with improvements observed in each Figure compared to the baseline results.

3 Summary

The above Examples, particularly the Figures presenting the results of the experimental work in the Examples, illustrate the effectiveness of the use of additives in accordance with the invention.

The Examples indicate that some additives were successful, and some additives were not successful. The successful additives reported above are ethylenediamine, polyethylenimine, and imidazole. The unsuccessful additives reported above are bipyridyl, phenanthroline, 8-amineoquinoline, cysteine, glycine, arginine, picoline, putrescine, spermidine, proline and ethanolamine.

The applicant developed the above-described mechanism invention and additive-specific invention in the process of analysing the results of the above Examples and experimental work on the above-mentioned and other additives.

Specifically, the applicant identified characteristics of additives that make it possible to form complexes comprising (a) sulfur, that has originated from copper minerals in the ore, and (b) additives that can enhance leaching of copper-containing ores or concentrates of the ores.

Many modifications may be made to the invention as described above without departing from the spirit and scope of the invention.

The invention claimed is:

1. A method of leaching copper-containing ores containing chalcopyrite and/or enargite, concentrates of the ores, or tailings of the ores or the concentrates, comprising leaching the copper-containing ores containing chalcopyrite and/or enargite, the concentrates of the ores, or the tailings of the ores or the concentrates with a leach liquor in the presence of an additive that enhances dissolution of copper from copper minerals in the ores by forming a complex between (a) sulfur, that has originated from copper minerals in the ores, and (b) the additive, wherein the concentration of the additive is up to 10 g/L in the leach liquor, and wherein leaching includes controlling the pH of the leach liquor to be less than 2.

2. The method according to claim 1, wherein the complex comprises sulfur from the copper minerals and the additive, with the additive breaking down a passivating layer or reducing a formation of a passivating layer and therefore increasing access for leaching copper from copper minerals in the ores during the method.

3. The method according to claim 1, wherein the additive comprises a nitrogen-containing complexing agent that includes at least two nitrogen atoms spaced by two carbon atoms to permit the additive to form complexes between sulfur, that has originated from copper minerals in the ores, and the additive.

4. The method according to claim 1, wherein the additive is a compound that contains molecular scaffold (I) or a polymer that contains molecular scaffold (I) repeated through the polymer:

wherein, the two nitrogen atoms are each independently substituted or unsubstituted, each nitrogen atom is selected from the group consisting of a primary amine group, a secondary amine group, and a tertiary amino group;

the two carbon atoms may each be substituted or unsubstituted;

the bonds between the nitrogen atoms and carbon atoms in the scaffold may be single bonds or multiple bonds; and the bonds between the two carbon atoms in the scaffold may be single bonds or multiple bonds.

5. The method according to claim 1, wherein the additive is a compound of formula (II) or a polymer formed from two of more monomers of formula (III):

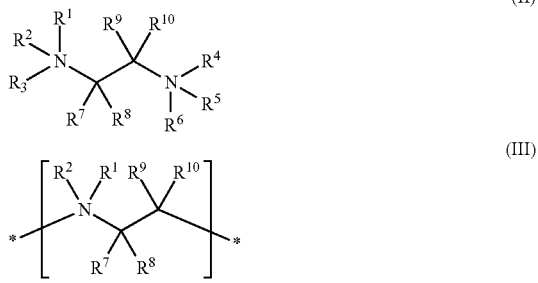

wherein, in formula (II) and (III), $R^1$, $R^2$, $R^3$, $R^4$, $R^5$ and $R^6$ are each independently selected from a lone pair electron, H, alkyl groups, alkenyl groups, alkynyl groups, or alkylamino groups, or the substituents on each of the two nitrogens together form an alkyl or alkynyl group that connect the two nitrogens to form a ring;

$R^7$, $R^8$, $R^9$ and $R^{10}$ are each independently selected from H, alkyl, alkenyl, alkynyl, OH, alkyloxy groups, alkenyloxy groups, alkynyloxy groups, C(=O)R where R is alkyl, alkenyl or alkynyl, C(O)OH, C(O)OR where R is alkyl, alkenyl or alkynyl, OC(=O)R where R is alkyl, alkenyl, alkynyl, amino, alkylamino, alkenylamino, or alkynylamino, C(O)NH₂, C(O)NHR where R is alkyl, alkenyl or alkynyl, C(O)NR₂ where R is alkyl, alkenyl or alkynyl, or $R^7$ and $R^8$ together and/or $R^9$ and $R^{10}$ together may be selected from =O, =NH, or =NH where R is alkyl, alkenyl, or alkynyl;

and in formula (III), $R^1$ or $R^2$ are each independently selected from the groups defined for $R^1$ and $R^2$ above or are connected to another monomer of formula (III).

6. The method according to claim 1, wherein leaching includes controlling the temperature to be less than 100° C.

7. The method according to claim 1, wherein leaching includes controlling the temperature to be at least 5° C.

8. The method according to claim 1, wherein leaching includes controlling the oxidation potential of the leach liquor during an active leaching phase to be less than 900 mV, wherein the oxidation potential is determined with respect to a standard hydrogen electrode.

9. The method according to claim 1, wherein leaching includes controlling the pH of the leach liquor to be greater than 0.5.

10. The method according to claim 1, wherein leaching includes bioleaching with microorganisms to assist leaching of copper minerals in the ores.

11. The method according to claim 1, wherein leaching includes adding chemical oxidants to the leach liquor.

12. The method according to claim 1, includes recovering copper from the leach liquor in downstream copper recovery steps.

13. The method according to claim 1, includes adding the additive to the leach liquor continuously or periodically during the method to maintain a required concentration during the method.

14. The method according to claim 1, includes adding the additive to ore fragments prior to the leaching.

15. The method according to claim 14, includes forming agglomerates of ore fragments and adding the additive to agglomerates prior to the leaching.

16. The method according to claim 14, includes forming agglomerates of ore fragments and adding the additive while forming agglomerates.

17. The method according to claim 14, includes forming agglomerates of ore fragments, wherein the additive is polyethylenimine (PEI), and the forming agglomerates includes:
(a) forming a PEI solution having a pH greater than pH 4.5;
(b) optionally heating the solution to at least 50° C. to speed up dissolution and/or dilution of the PEI; and
(c) adding the PEI solution to ore fragments at the start of the forming agglomerates.

18. The method according to claim 1, includes regenerating the leach liquor and recycling the regenerated leach liquor to a heap.

19. The method according to claim 18, includes adjusting the concentration of the additive in the regenerated leach liquor to maintain a concentration of up to 10 g/L in the leach liquor.

20. The method according to claim 18, includes adding or removing the additive to the regenerated leach liquor to maintain a concentration of up to 10 g/L in the leach liquor.

21. A method of leaching copper-containing ores, concentrates of the ores, or tailings of the ores or concentrates, that includes leaching the copper-containing ores, the concentrates or the tailings of the ores, or the concentrates with a leach liquor in the presence of a nitrogen-containing organic complexing additive that forms a complex between sulfur, that has originated from copper minerals in the ores, wherein the additive is a degradation product that forms under conditions of the leach.

22. The method defined in claim 21, wherein the complex comprises sulfur in a passivating layer on copper minerals and the additive, with the complex breaking down the passivating layer or reducing formation of the layer and therefore allowing greater access for leaching copper from copper minerals in the ores during the method.

23. The method defined in claim 21, wherein the degradation product is a degradation product of another additive.

24. The method defined in claim 21, wherein the nitrogen-containing organic complexing additive includes at least two nitrogen atoms.

25. The method defined in claim 24 wherein each of the at least two nitrogen atoms in the additive is present as a primary amine group, a secondary amine group, or a tertiary amine group.

26. The method defined in claim 21 wherein the nitrogen-containing complexing additive includes at least two nitrogen atoms spaced by two carbon atoms to permit the additive to form the complex.

27. The method defined in claim 21 wherein the additive is a compound that contains molecular scaffold (I) or a polymer that contains molecular scaffold (I) repeated through the polymer:

wherein, the two nitrogen atoms are each independently substituted or unsubstituted, each nitrogen atom is selected from the group consisting of a primary amine group, a secondary amine group, and a tertiary amino group;

the two carbon atoms may each be substituted or unsubstituted;

the bonds between the nitrogen atoms and carbon atoms in the scaffold may be single bonds or multiple bonds; and the bonds between the two carbon atoms in the scaffold may be single bonds or multiple bonds;

or the additive is a compound of formula (II) or a polymer formed from two of more monomers of formula (III):

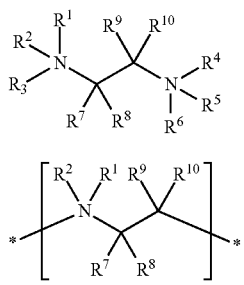

wherein, in formula (II) and (III), $R^1$, $R^2$, $R^3$, $R^4$, $R^5$ and $R^6$ are each independently selected from a lone pair electron, H, alkyl groups, alkenyl groups, alkynyl groups, and alkylamino groups, or the substituents on each of the two nitrogens together form an alkyl or alkynyl group that connect the two nitrogens to form a ring;

$R^7$, $R^8$, $R^9$ and $R^{10}$ are each independently selected from H, alkyl, alkenyl, alkynyl, OH, alkyloxy groups, alkenyloxy groups, alkynyloxy groups, C(=O)R where R is alkyl, alkenyl or alkynyl, C(O)OH, C(O)OR where R is alkyl, alkenyl, or alkynyl, OC(=O)R where R is alkyl, alkenyl, alkynyl, amino, alkylamino, alkenylamino, alkynylamino, C(O)NH$_2$, C(O)NHR where R is alkyl, alkenyl, or alkynyl, C(O)NR$_2$ where R is alkyl, alkenyl or alkynyl, or $R^7$ and $R^8$ together and/or $R^9$ and $R^{10}$ together may be selected from =O, =NH or =NH where R is alkyl, alkenyl or alkynyl;

and in formula (III), $R^1$ or $R^2$ are each independently selected from the groups defined for $R^1$ and $R^2$ above or are connected to another monomer of formula (III).

28. A method of leaching copper-containing ores, concentrates of the ores, or tailings of the ores or the concentrates, comprising leaching the copper-containing ores, the concentrates of the ores, or the tailings of the ores or the concentrates with a leach liquor in the presence of an additive that enhances dissolution of copper from copper minerals in the ores by forming a complex between (a) sulfur, that has originated from copper minerals in the ores, and (b) the additive, wherein the additive is a compound of formula (II) or a polymer formed from two of more monomers of formula (III):

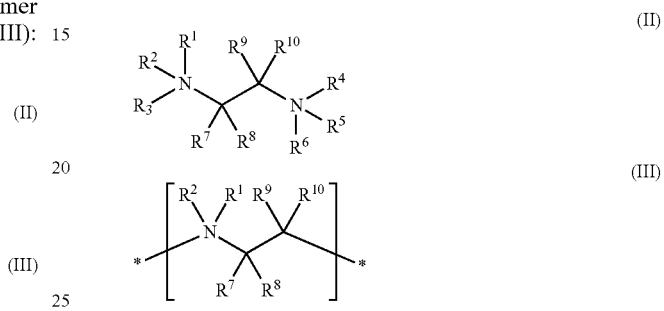

wherein, in formula (II) or (III), $R^1$, $R^2$, $R^3$, $R^4$, $R^5$ and $R^6$ are each independently selected from a lone pair electron, H, alkyl groups, alkenyl groups, alkynyl groups, and alkylamino groups, or the substituents on each of the two nitrogens together form an alkyl or alkynyl group that connect the two nitrogens to form a ring;

$R^7$, $R^8$, $R^9$ and $R^{10}$ are each independently selected from H, alkyl, alkenyl, alkynyl, OH, alkyloxy groups, alkenyloxy groups, alkynyloxy groups, C(=O)R where R is alkyl, alkenyl or alkynyl, C(O)OH, C(O)OR where R is alkyl, alkenyl, or alkynyl, OC(=O)R where R is alkyl, alkenyl, or alkynyl, amino, alkylamino, alkenylamino, or alkynylamino, C(O)NH$_2$, C(O)NHR where R is alkyl, alkenyl, or alkynyl, C(O)NR$_2$ where R is alkyl, alkenyl, or alkynyl, or $R^7$ and $R^8$ together and/or $R^9$ and $R^{10}$ together may be selected from =O, =NH, or =NH where R is alkyl, alkenyl, or alkynyl;

and in formula (III), $R^1$ or $R^2$ are each independently selected from the groups defined for $R^1$ and $R^2$ above or are connected to another monomer of formula (III).

* * * * *